Jan. 19, 1943.   F. H. LUECKE   2,308,528
GROUNDING EQUIPMENT FOR ELECTRICAL APPARATUS
Filed April 5, 1940
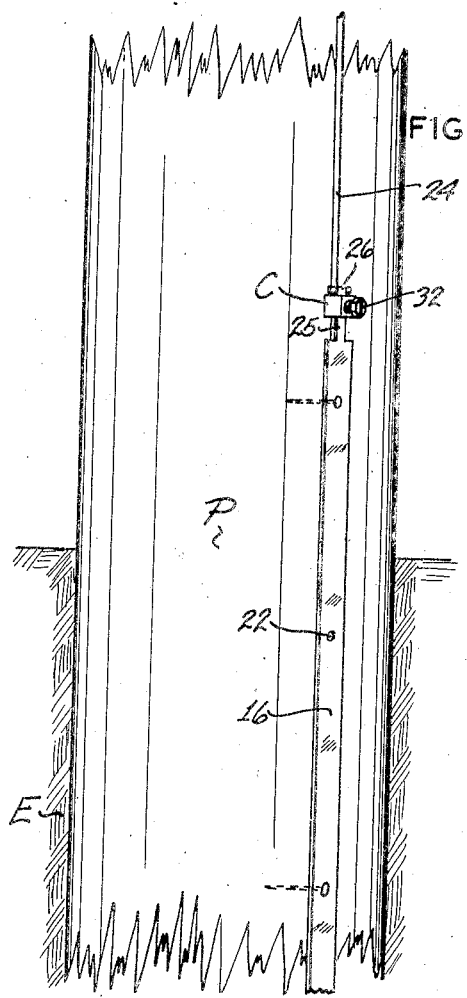
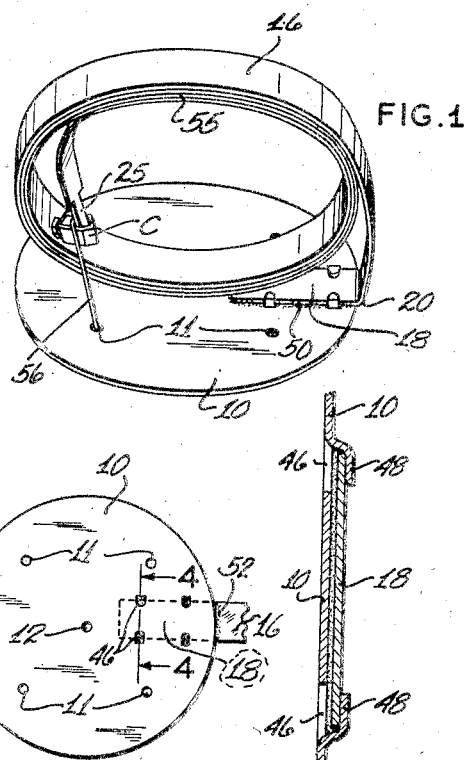
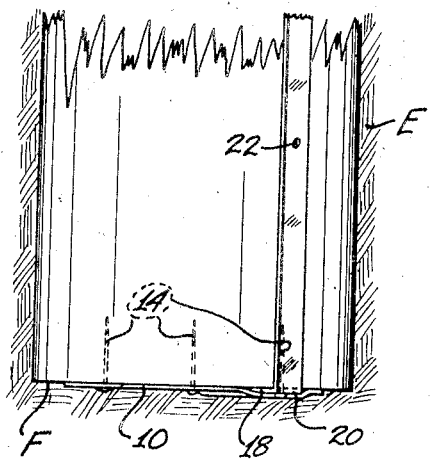
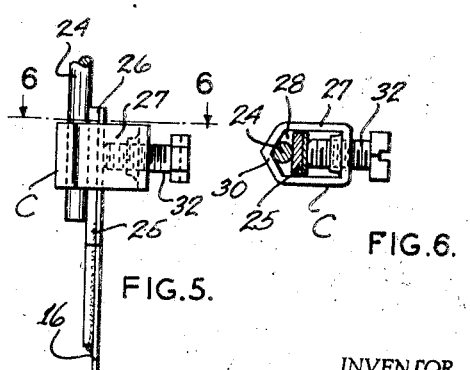
INVENTOR.
FREDERICK H. LUECKE
BY
ATTORNEY.

Patented Jan. 19, 1943

2,308,528

UNITED STATES PATENT OFFICE 2,308,528

GROUNDING EQUIPMENT FOR ELECTRICAL APPARATUS

Frederick H. Luecke, Fort Wayne, Ind.

Application April 5, 1940, Serial No. 327,940

3 Claims. (Cl. 174—6)

This invention relates to grounding equipment for electrical apparatus, and more particularly to improved low cost assemblies for perfecting ground connections of the types required for outdoor electrical apparatus, electrical lines, cable lines, transformers, switches and the great variety of items of apparatus utilized in power line equipment, telephony, telegraphy, radio, and communication and power work generally.

Most of the grounding equipment heretofore employed in connection with electrical apparatus, has been of the types in which a rod, length of wire, or other elongate conductor is driven into the earth a requisite distance. Due to the ease of lateral displacement of such elements, and the fact that they are often set or driven only to shallow depths, an originally relatively effective ground connection may, after a short time, become so loosened in the circumjacent soil as to become practically worthless. Furthermore, when any appreciable tension is applied to grounding rods or the like, they are relatively easily displaced in a vertical direction, thus destroying at least in part, their original effectiveness. Accordingly it is a major object of the present invention to provide a grounding assembly for the many general purposes noted, which will provide a relatively greater effective ground-engaging area than the older prevailing forms of ground, which may be more economically produced and sold than any known prevailing type of grounding appliance, and which, when once set, will be practically incapable of dislodgment and disturbance in a manner to impair its effectiveness.

Yet another object is attained in a grounding assembly which utilizes the weight of a pole or other superposed loading element in a manner to maintain the major contacting element of the assembly in a constant compression, firm engagement and hence good electrical contact with the soil strata at a substantial depth below the ground level, and in most localities, at a depth substantially below that of the prevailing water table, thus assuring the permanent location and firmness of the grounding assembly in the soil in such manner that the efficiency of the ground connection is not readily impaired by pulling or shaking forces, or by settling of the earth away from the contacting surfaces of the assembly.

Yet another object of the invention is attained in improved provisions for securement of a conductor element extending from above to a zone well below the ground level, to a conducting plate or disc of substantial area, and in such manner that the electrical connection between the lead-down conductor and the major grounding element, is not impaired by oxidation or other chemical action of either air or ground water.

A still further object of the invention is attained in an improved manufactured article which, although sold completely assembled and ready for attachment and use, is compacted into a relatively small compass so as to constitute a neat shipping and sales package, thus minimizing transportation costs and room required for storage of the units in substantial numbers.

The foregoing and numerous other objects will more clearly appear from the following detailed description of the presently preferred embodiment of the invention, when considered in connection with the accompanying drawing, in which:

Fig. 1 is an elevation in perspective of the ground assembly as manufactured and sold for use in the trade; Fig. 2 is a vertical elevation of the butt end of a power line pole or the like to which is attached and with which is utilized the device shown by Fig. 1; Fig. 3 is a bottom plan view of the disc or plate element constituting the major grounding member of the assembly; Fig. 4 is an enlarged section, through the disc and a connected strip, as viewed along line 4—4 of Fig. 3; Fig. 5 is a side elevation of a preferred form of connector, for completing the electrical connection to the ground wire or the like, and Fig. 6 is a transverse section along line 6—6 of Fig. 5.

Referring now by characters of reference to the drawing, the device is shown in usage by Fig. 2, wherein is indicated a butt end portion of a pole P, set to the required depth in the circumjacent earth E.

The grounding assembly includes as the major element for earth contact, a disc or plate 10, preferably of sheet metal of good conducting characteristics, such as sheet copper. It is preferred that the copper disc or plate 10 and as well the conductor hereinafter described and secured to the disc, be of a gauge, for example 18 or 20 gauge metal, so as to enable in application and usage of the assembly, the disc 10 to be readily conformed to the butt end face F of the pole. Provision for attaching the plate 10 to the lower face F of the pole P, is preferably made by providing a series of angularly spaced openings 11 and a central such opening 12, through which may be readily driven the desired number of nails 14 (Fig. 2) directly through the plate and into the end face of the pole.

A conductor element for connection to a ground wire or the like leading to the apparatus to be grounded, is preferably made through a flexible conductor of circular or flattened section, for example a strip of good conducting metal such as copper or alloys thereof, the strip being generally indicated at 16. The lower end of the strip is secured, by means hereinafter described, radially along one face of the disc or sheet 10, preferably contacting the disc or plate 10 over an area at least several inches in length. This securement end of the strip 16 is indicated at 18, and extends outwardly along the disc or plate to a zone slightly beyond its margin, whence the strip is bent upwardly at substantially a right angle, say at about the zone 20. In order to minimize any tendency to damage of the ground strip by casual contact, it is provided with a row of apertures 22 through each of which may be driven a long special nail or other desired form of holding element whereby the strip 16 is secured snugly adjacent the surface of the pole.

In order to effect a good electrical connection with the ground wire such as 24 directed, say to a transformer, cable terminal connection, lightning arrester, outdoor switching equipment or the like, there is provided, as best shown by Figs. 5 and 6, an arrangement consisting of a restricted length of the free end portion 25 of the strip 16, which part 25 is also by preference of somewhat reduced width as compared to the normal width of strip 16. The part 25 is further, by preference, so formed as to provide, at its outer terminus, a bar-shaped portion 26, which is formed by permitting a greater width of metal to remain, than characterizes the portion 25. The T-shape conformity 25—26, serves to receive and extend through the body 27 of a connector clamp, the latter being generally indicated by the letter C. The clamp per se forms no part of the present invention, except as constituting broadly an element of the combination. Clamps of this type have been known for some time past, and are readily available to the trade; obviously other forms of clamps may be used, but the device C is selected for illustration because of low cost and simplicity of structure. As will readily appear from Figs. 5 and 6, the body 27 of the clamp C provides a through passage 28, and the clamp is so selected as to size, as readily to accommodate the portion 25 on the end of the strip 16, as well as the largest size ground wire, which according to certain specifications, will be of the order of #4 or even larger. It is a preference that the ground wire, such as 24, be seated in the V-shaped end portion 30 of the clamp, with the element 25 on the opposite side of the wire and positioned in engagement with the wire by the end of the clamping screw 32 of the clamp, the latter threadedly engaging the body 27 through a tapped aperture (not shown). If desired, the elements 25 and 26 may be formed of a separate, perhaps somewhat heavier gauge strip, secured as by rivetting or soldering to the main length of strip 16.

The T-shaped end resulting from parts 25 and 26 on the strip 16, enables the clamp C, when the screw 32 is threaded out, to be inserted over the head 26. The clamping body 27 is then turned to bring the wire 24 into the crotch 30 of the clamp with the strip portion 25 thereover, and the clamp screw 32 is tightly threaded up.

The described arrangement of connector offers a number of advantages, among which are the fact that the connector clamp C may be supplied with the grounding appliance as manufactured, and will be securely retained on the free end of the strip thereof against casual disengagement, by virtue of the effect of the head portion 26. Experiments with other and more usual types of clamp, particularly those forms requiring a loop or bight to be formed in the end of the ground wire 24, have resulted in occasional failure of connection because of liability of breakage of the looped terminal end of the ground wire. This is particularly true on power lines or others, wherein a ground wire say of a gauge of #4 or larger is used, inasmuch as the larger gauges of wire exhibit a tendency to breakage when formed into a connecting loop of any restricted diameter. This difficulty and all others are effectively overcome by the clamp and connector combination as described.

Referring now further to the preferred manner of securement of the inner or lower end of the strip 16, to the disc or plate 10, it is a preference that the contacting end 18 of the strip extend into overlying relation with the disc or plate 10, between the plate and the face F of the pole. It is of course possible and not impractical to secure the strip end 18, to the outer face of the disc, but the preferred position of this end between the disc and the pole face offers the advantage of a greater tendency of the weight of the pole, when the device is in use, to cause the end of the strip to bear more firmly against the grounding plate or disc than is the case were the end 18 disposed on the outside surface of the disc.

A further feature of improvement consists in the provision of an improved electrical connection between the strip end 18 and the disc, so as to insure a good contact between these elements even after a long period of service. By preference the physical and electrical connection of the strip and plate is perfected by a structural connection of tongue and slot type, coupled with a metallic union of the parts at least about the marginal areas of the strip end 18. Referring first to the structural connection, there is preferably provided in the plate, a plurality of apertures from which the metal is incompletely removed, the metal from the apertured areas being outstruck to form a plurality of tongues or tabs, the partially cut areas being indicated at 46 and the tongues resulting from deformation of the partly cutout metal, at 48. In assembling the strip to the plate or disc the end 18 of the strip is brought beneath the tongues or tabs which are then deformed by pressure or impact with the strip held firmly between the tongues and the body of the disc. It is obvious of course that either the strip element or plate element, or both, may be provided with the tongues and slots.

Since in certain soils there is a tendency to oxidize or corrode slightly the surface of the copper or other metal from which the grounding assembly is formed, it is a preference to insure a long-lived effective contact between the strip and plate by excluding from their contacting areas ground water which might otherwise find its way between the parts, and through oxidation, reduce or nullify their effective contact areas. This result is accomplished, according to present preference, by a line of solder 50 (Fig. 1) extending uninterruptedly from the margin of the disc inwardly along the lateral and end margins of the strip end 18. An end seal is similarly provided by a line of solder 52 extending marginally of the disc or plate adjacent the strip end. By a still further preference, a spot or line of solder is applied in the zones of each of the apertures 46 resulting from the outstruck tongue or tab portions, thus fully sealing the zone of engagement of the strip and disc, against entrance of extraneous materials such as rock particles or ground water.

The manner of installation and advantages in use of the present improvements are thought to have been fully apparent from the foregoing description and drawing, but it may be noted that the disc 10 is applied to the face F of the pole P prior to setting the pole, as by the nails 14. These may, if desired, be of a special form (not shown) particularly adapted for good holding power when driven along the grain of the wood. After application of the disc to the pole face, the conductor strip 16 is brought upwardly along the pole and secured thereto by holding elements only a few of which are shown, extending through the row of openings 22. The pole may then be set in the usual manner, the strip 16 being of a length so as to bring the ground wire terminal connection slightly below, at, or above ground level and if desired, even to a height substantially above the ground level to minimize hazards of traffic and tampering. The manner of completing the connection of ground wire 24 to the strip 16, has been heretofore described.

A distinct advantage of the preferred form of the ground assembly described, as previously referred to in the objects above given, is its facility for being shipped and stored in compact form, in spite of the attenuated character of the device in position of use. It is a preference, to attain a compact shipping package, that the strip 16 be brought upwardly from one face of the disc 10, thence coiled upon itself in clockspring fashion substantially as shown by Fig. 1, so that the resulting coil or loop of the strip overlies the disc 10, and so the diameter of the coil does not materially exceed the diameter of the disc. The coil 55 may be conveniently retained in rolled or wrapped form and kept in overlying relation to the disc, by the insertion of a temporary holding member such as a wire 56 wrapped about or otherwise secured to the free end of the strip 16, thence extending through one or more of the openings 11 of the disc.

It will have appeared as desirable, and as suggested by Fig. 2, that the area of the disc or plate 10 preferably conform substantially to the area of the bottom face F of the pole, when the grounding assembly is utilized with a pole or like superposed loading element. It is to be understood however that the device as manufactured may be utilized with or without any loading other than the pressure of the earth thereover or thereabout. For example, for many uses, the plate 10 may be set in an earth opening of requisite size and loaded with rock or any other heavy material, with excellent results as a ground connection.

Although the materials for the strip and plate have been specified by preference as consisting of copper or copper alloy or similar metals, the recitals herein of preferences for materials, gauges, etc. shall not be understood as restrictive, particularly since the device of the present design lends itself admirably to production in a wide range of diameters or areas of disc or plate elements as well as a wide variety of gauges or thickness of metal employed in the plate 10 and conductor 16, it being understood that the latter may be of a wire stock as well as of strip form; if wire stock is used, the end secured to the plate may be flattened for connection in the manner described.

It will have appeared that when the ground assembly is installed in the manner described, the plate or disc 10 will be always subject to the pressure resulting from the weight of the pole against the subjacent earth, so that, even should some portion of the earth E settle away from the pole butt, it will always remain a dependable and substantial grounding area between the plate 10 and the earth. Since, in most localities, the pole will be set to a depth which will bring its butt face well below the usual water table, the ground disc 10 will thus be permanently retained in moist soil, and in compressive contact therewith due to the weight of the pole.

In addition to the many advantages specifically noted in, and implied from the foregoing description, it will have appeared that the present arrangement serves fully to attain each and all of the objects above outlined.

Although the invention has been described by making specific reference to a presently preferred embodiment thereof, numerous changes may be made in the parts and in their combinations, without departing from the full intended spirit and scope of the invention as defined by the appended claims.

I claim as my invention.

1. As an article of manufacture, a ground-forming assembly for use with outdoor electrical equipment, including a substantially planar disc of sheet metal of good conducting properties, a strip of flexible metal of good conducting properties engaging one face of the disc, the strip end engaging the disc, being structurally secured to and metallically united with the disc, a ground wire connector near the free end of the strip, the strip being disposed, in the article as manufactured, in coil form, with its outer or free end innermost of the coil.

2. As an article of manufacture, a grounding assembly including a circular plate provided with a plurality of spaced apertures adapted for the reception of holding elements and securement of the plate to the butt face of a pole, a flexible conducting strip having one end overlying the face portion of the plate, the plate being provided with a plurality of outstruck tongue portions and the end of the strip being received between the tongue and body portions of the plate and thus structurally secured to the plate, a continuous line of solder about the marginal portions of the strip overlying the plate, the outer or free end of the strip being provided with a wire connector for engagement with a grounding wire or the like, and the strip, as the article is manufactured, being closely wound upon itself, with its free end innermost, and a holding element for releasably maintaining the strip in coiled form, engaging the free end of the strip, and the apertured portion of the plate.

3. As an article of manufacture, a ground-forming assembly for use with a pole and outdoor electrical equipment, the assembly including a substantially planar disc of a conducting metal, and of a gauge sufficiently light to enable the disc, when installed just below the butt face of the pole, to conform closely to such face, a strip of flexible metal of good conducting properties having a substantial portion of one of its ends overlying one face portion of the disc, one of the last said portions being provided with an integral tongue overlying and fastening the other portion, and the said portions being metallically united, the strip extending outwardly from the face of the disc engaged by said strip end portion, and a ground wire connector near the free, outer end of the strip, the strip being arranged in a series of convolutions in the article as manufactured, and its free end and convolute portion readily detachably secured to the disc.

FREDERICK H. LUECKE.